(12) United States Patent
Pursifull

(10) Patent No.: US 8,635,991 B2
(45) Date of Patent: Jan. 28, 2014

(54) APPROACH FOR CONTROLLING FUEL FLOW WITH ALTERNATIVE FUELS

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/011,658

(22) Filed: Aug. 27, 2013

(65) Prior Publication Data

US 2013/0340715 A1 Dec. 26, 2013

Related U.S. Application Data

(63) Continuation of application No. 12/790,694, filed on May 28, 2010, now Pat. No. 8,516,997.

(51) Int. Cl.
*F02M 15/00* (2006.01)

(52) U.S. Cl.
USPC ......... 123/514; 123/541; 123/41.31; 123/525

(58) Field of Classification Search
USPC .......... 123/41.2, 41.21, 41.31, 540, 541, 514, 123/575, 525
See application file for complete search history.

(56) References Cited

U.S. PATENT DOCUMENTS

| | | | |
|---|---|---|---|
| 3,810,714 A | 5/1974 | Turner | |
| 4,098,236 A | 7/1978 | Okawa | |
| 4,155,337 A | 5/1979 | Hensley | |
| 4,159,698 A | 7/1979 | Berenbaum | |
| 4,195,608 A | 4/1980 | Sanada et al. | |
| 4,301,781 A | 11/1981 | Lindberg | |
| 4,349,002 A | 9/1982 | Allen | |
| 4,505,124 A | 3/1985 | Mayer | |
| 4,539,962 A | 9/1985 | Nichols | |
| 5,325,838 A * | 7/1994 | Bennett | 123/527 |
| 5,509,392 A | 4/1996 | Schmitz | |
| 5,887,555 A | 3/1999 | Schmitz | |
| 5,957,113 A | 9/1999 | Masaki et al. | |
| 6,189,516 B1 | 2/2001 | Hei Ma | |
| 6,216,675 B1 * | 4/2001 | Bennett | 123/541 |
| 6,230,692 B1 | 5/2001 | Thompson | |
| 6,250,290 B1 * | 6/2001 | Mullen | 123/541 |
| 6,581,579 B1 | 6/2003 | Knight et al. | |
| 6,840,219 B2 | 1/2005 | Joos et al. | |
| 7,150,270 B2 * | 12/2006 | Hoffmann et al. | 123/514 |
| 7,207,321 B2 * | 4/2007 | Vadimovitch et al. | 123/527 |
| 7,506,638 B2 * | 3/2009 | Shinkarenko et al. | 123/514 |
| 8,196,567 B2 | 6/2012 | Pursifull et al. | |
| 2003/0101972 A1 | 6/2003 | Burke et al. | |
| 2004/0140009 A1 | 7/2004 | Yu et al. | |
| 2009/0206097 A1 | 8/2009 | Gebert et al. | |
| 2011/0168132 A1 | 7/2011 | Pursifull | |
| 2012/0152489 A1 | 6/2012 | Hagen | |
| 2013/0032125 A1 | 2/2013 | Jang | |
| 2013/0055728 A1 | 3/2013 | Lurken et al. | |

* cited by examiner

OTHER PUBLICATIONS

Pursifull, R., "Fuel Rail Pressure Relief", SAE Technical Paper Series No. 2006-01-0626, 2006 World Congress, Detroit, MI., Apr. 3-6, 2006, 13 pages.

*Primary Examiner* — Thomas Moulis

(74) *Attorney, Agent, or Firm* — Julia Voutyras; Alleman Hall McCoy Russell & Tuttle LLP

(57) ABSTRACT

A fuel pump temperature is regulated by selectively directing liquid fuel to an expansion section to evaporate the liquid fuel and create a drop in temperature to thermally cool the fuel pump.

16 Claims, 9 Drawing Sheets

APPROACH FOR CONTROLLING FUEL FLOW WITH ALTERNATIVE FUELS

CROSS REFERENCE TO RELATED APPLICATIONS

The present application is a continuation of U.S. patent application Ser. No. 12/790,694, filed May 28, 2010, now U.S. Pat. No. 8,516,997, the entire contents of which are hereby incorporated by reference for all purposes.

BACKGROUND AND SUMMARY

In some internal combustion engine applications, liquid propane injection can provide some potential benefits when used for combustion. As one example, liquid propane injection provides reduced air displacement that allows for increased air mass to enter an engine cylinder resulting in increased volumetric efficiency relative to gaseous propane injection. Furthermore, in some cases, liquid propane may be more readily available and adaptable for refueling at home, such as in rural areas. Moreover, in some cases, liquid propane may provide a cheaper alternative to gasoline.

A typical liquid injection propane fuel system for an internal combustion engine supplies liquid propane from a pressurized tank via a fuel pump to a fuel rail.

However, the inventor has recognized several potential issues with such liquid propane fuel systems. For example, liquid propane in the liquid injection propane system may be exposed to high temperatures (e.g., due to engine operation) that can increase the pressure of the liquid propane beyond a liquid-to-gas phase change pressure or critical point at which liquid propane and gaseous propane are no longer distinct. At such a pressure, gaseous propane does not enter into the fuel pump and the fuel pump is unable to pump propane to the fuel rail for injection.

In one example, the above mentioned issues may be addressed by a method for controlling fuel flow in a vehicle. The method may comprise directing a liquid fuel from a fuel tank to a fuel pump, and in response to a temperature of the fuel pump being greater than a threshold, directing at least some of the liquid fuel to an expansion section, thermally connected to the fuel pump, where the liquid fuel evaporates to a gaseous fuel to thereby cool the fuel pump.

By directing liquid propane to the expansion section, the liquid propane can go from a liquid state to a gaseous state that causes a temperature drop (e.g., 218° K) that can be thermally transferred to the fuel pump to cool the fuel pump. In other words, the propane can be used as a refrigerant to cool the fuel pump so that the liquid propane does not reach the liquid-to-gas phase change pressure. In this way, the fuel pump temperature can be controlled so as to inhibit gaseous propane from entering the fuel pump and inhibiting fuel pump operation.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this description.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

The present description relates to a fuel system for an internal combustion engine of a vehicle. More particularly, the present description relates to a fuel system that provides versatility so that different fuel types can be injected for combustion, if desired. The fuel system is capable of evacuating the fuel rail upon vehicle shut-off to reduce emissions. Further, since the fuel rail is evacuated different fuels can be selected for combustion upon start-up. For example, the fuel system may include an ejector to evacuate fuel from a fuel rail during an engine shut-off condition of the vehicle. During engine operation, a fuel pump delivers fuel from a fuel tank to the fuel rail. On the other hand, during the engine shut-off condition, the fuel pump provides the motive flow for the ejector to evacuate fuel residing in the fuel rail back into the fuel tank. In some embodiments, the fuel system may include a plurality of ejectors, connected in different stages, to provide a lower evacuation pressure that further reduces fuel rail pressure so as to evacuate a greater amount of fuel from the fuel rail back to the fuel tank.

As another example, the fuel rail can be evacuated by leveraging a pressure differential between the fuel rail and a fuel tank to push out liquid fuel from the fuel rail and direct it to the fuel tank. Subsequently, gaseous fuel remaining in the fuel rail can be directed to a fuel vapor canister to evacuate the fuel rail. Since the fuel rail is evacuated, the fuel system provides the ability to select a different type of fuel for combustion at start-up.

Furthermore, the fuel system may include a fuel pump that is temperature controlled to accept different fuel types by selectively providing liquid fuel as a refrigerant to cool the fuel pump. In particular, liquid fuel can be selectively directed to an expansion section that is thermally connected to the fuel pump to cool the fuel pump to a suitable temperature. Accordingly, pressure can be reduced to prevent a selected fuel type from undergoing a liquid-to-gas phase change that would inhibit the fuel pump from pumping the liquid fuel.

The subject matter of the present description is now described by way of example and with reference to certain illustrated embodiments. Components that may be substantially the same in two or more embodiments are identified coordinately and are described with minimal repetition. It will be noted, however, that components identified coordinately in different embodiments of the present description may be at least partly different. It will be further noted that the drawings included in this description are schematic. Views of the illustrated embodiments are generally not drawn to scale; aspect ratios, feature size, and numbers of features may be purposely distorted to make selected features or relationships easier to see.

Figure 1:
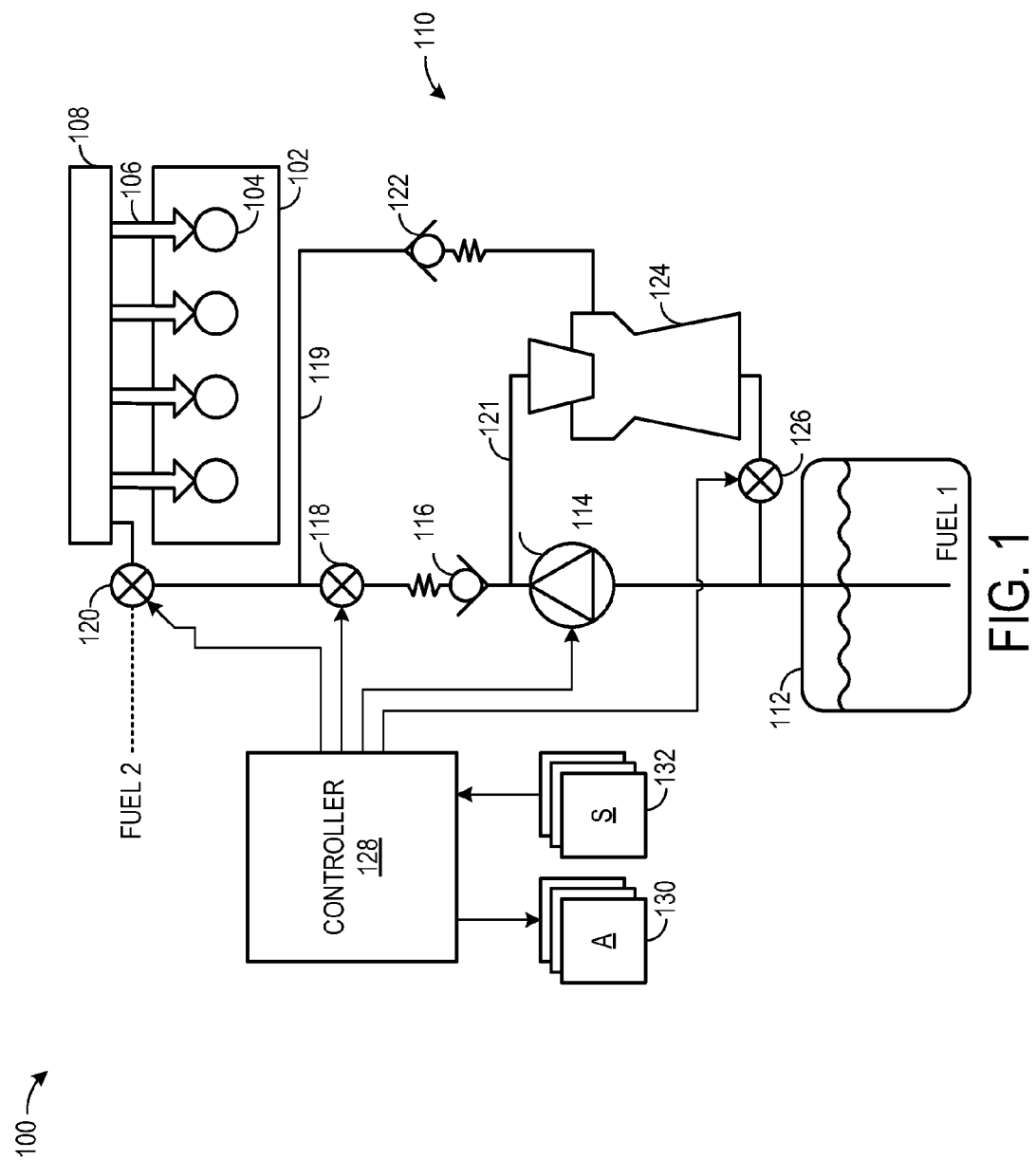
FIG. 1 shows an embodiment a fuel system for an internal combustion engine including a single fuel rail evacuation stage including an ejector.

FIG. 1 schematically shows an engine system 100 that may be included in a propulsion system of an automobile or other vehicle. The engine system 100 includes an internal combustion engine 102. The internal combustion engine 102 includes one or more cylinders 104 that may receive intake air from an intake manifold (not shown) and/or fuel from one or more fuel injectors 106. The fuel injectors 106 may be arranged in an intake passage in a configuration that provides what is known as port injection of fuel into the intake port upstream of the cylinder 104. The fuel injector 106 may inject fuel in proportion to a pulse width of a signal received from a controller 128 via an electronic driver (not shown). Fuel may be delivered to the fuel injector 106 from a fuel rail 108 by a fuel system 110. In some embodiments, cylinder 104 may alternatively or additionally include a fuel injector coupled directly to cylinder 104 for injecting fuel directly therein, in a manner known as direct injection.

The fuel system 110 may include a fuel tank 112 for storing fuel that is supplied to the fuel rail 108. More particularly, a fuel pump 114 may be operable by controller 128 to pump fuel from the fuel tank 112 to the fuel rail 108. In the illustrated embodiment, the fuel pump 114 is shown outside of the fuel tank 112 positioned downstream of the fuel tank and upstream of the fuel rail 108. In some embodiments, the fuel pump 114 may be positioned inside the fuel tank 112 in what is known as an in-tank fuel pump. The fuel tank 112 may be pressurized to maintain fuel stored in the fuel tank at a desired pressure. For example, the fuel tank may be pressurized at a pressure suitable to store propane in a liquefied state. The fuel pump may pump liquefied propane from the fuel tank to the fuel rail. Moreover, the pressure at which the fuel system operates may change according to the type of fuel (e.g., liquid propane, gaseous propane, gasoline, etc.) that is stored in the fuel system.

A delivery check valve 116 may be positioned downstream of the fuel pump 114 to force fuel pumped from the fuel pump at a predetermined pressure to the fuel rail 108 so that fuel does not return along the same path to the fuel pump. A first solenoid valve 118 may be positioned downstream of delivery check valve 116 to control the flow of fuel to fuel rail 108 or from the fuel rail to a return line 119. It will be appreciated that the fuel return line may be positioned in any suitable portion of the fuel system. For example, the return line can be positioned inside or at the fuel tank. As another example, the fuel return line can be positioned near the entry/exit to the fuel rail. The difference in position can affect the time to re-pressurize the fuel system. For example, if the return line runs all the way to the fuel rail, the time to re-pressurize the fuel system may be reduced and/or substantially minimized.

In some embodiments, fuel system 110 may be what is known as a multi-fuel system that selectively provides a plurality of different types of fuel to the fuel rail 108 based on the mode of operation. As an example, the fuel system may be a bi-fuel system that selectively provides gasoline and/or liquid propane to the fuel rail based on the mode of operation.

A three-way valve 120 may be positioned upstream of the fuel rail 108 and downstream of the first solenoid valve 118 and the return line 119 to selectively control the flow of a desired type of fuel to the fuel rail 108. The state of the three-way valve 120 may be controlled by controller 128 to vary which type of fuel is delivered to the fuel rail 108. In embodiments of the fuel system 110 where only one type of fuel is delivered to the fuel rail 108, the three-way valve 120 may be omitted.

Fuel in the fuel rail 108 may be returned to the fuel tank 112 via the return line 119. An ejector 124 (a.k.a. eductor, jet pump, venturi pump, aspirator) may be positioned in the return line 119 to provide a single fuel rail evacuation stage. The ejector 124 pumps fuel in return line 119 to fuel tank 112 based on receiving a motive flow from the fuel pump 114. The fuel pump 114 is operable to provide a motive flow to the ejector 124 via a motive flow line 121 that is positioned downstream of the fuel pump and upstream of the delivery check valve 116. More particularly, the ejector 124 converts flow energy of a motive fluid (e.g., fuel from the fuel pump) to create a low pressure zone that draws in and entrains a suction fluid (e.g., fuel in the return line) that enters an inlet of the ejector from the return line 119. Inside the ejector 124, a mix of the motive fluid and the suction fluid expands and the velocity is reduced which results in recompressing the mix of fluids by converting velocity back into pressure energy that pumps the fuel through an outlet of the ejector 124 to fuel tank 112.

A return check valve 122 is positioned in the return line 119 downstream of the ejector 124 to force fuel returning from the fuel rail 108 at a predetermined pressure to ejector 124 so that fuel is evacuated from the fuel rail 108. In some embodiments, the fuel rail may have a single fuel port. In some embodiments, the fuel rail may have a dedicated port for fuel entry and a dedicated port for fuel exit. In such embodiments, the fuel exit port can be located at a low point in the fuel rail so that the liquid fuel is first evacuated before gaseous fuel is evacuated. In this way, the time to empty the fuel rail can be reduced. Note that some liquid fuel rails typically feed from the top to minimize the risk of "fuel push out" due to the fuel's vapor pressure. In the system described herein, the feed may be positioned at a low point so that the fuel's vapor pressure enhances fuel push-out to more quickly evacuate the fuel rail.

A second solenoid valve 126 is positioned upstream of the outlet of the ejector 124 and downstream of the fuel tank 112. The state of the first solenoid valve 118 and the state of the second solenoid valve 126 (and the three-way valve 120 when applicable) may be controlled by controller 128 to pressurize the fuel rail 108 or evacuate the fuel rail based on the mode of operation. For example, during a fuel rail pressurization mode where the engine is operating, the controller can open the first solenoid valve 118 and close the second solenoid valve 126 (and adjust the three-way valve so that a first type of fuel stored in fuel tank 112 is allowed to flow to the fuel rail in a multi-fuel system) to direct fuel pumped from the fuel pump 114 to the fuel rail 108 to pressurize the fuel rail. As another example, during a fuel rail evacuation mode when the engine is shut-off or not operating, the controller 128 can close the first solenoid valve 118 and open the second solenoid valve 126 (and adjust the three-way valve so that fuel in the fuel rail 108 is allowed to flow from the fuel rail to the return line 119 in a multi-fuel system) to direct fuel pumped from the ejector 124 back to the fuel tank 112.

It will be appreciated that the engine system may operate in the fuel rail evacuation mode until a suitable amount of fuel has been evacuated from the fuel rail or until a suitable fuel rail pressure has been achieved. At which time (e.g., a predetermined duration after engine shut-off), the fuel pump may be shut-off and the state of the solenoid valves may be varied since the fuel pump is not operating to increase the pressure in the fuel system.

In some embodiments, the solenoid valves 118 and 126 can be replaced with a three-way valve where the flow can be selectively placed in normal pumping mode during vehicle/engine in-use conditions or set to circulate flow through the ejector to evacuate the fuel rail during vehicle/engine shut-off conditions. Note the solenoid valves, check valves, and three-way valve are exemplary. It will be appreciated that any suitable type of valve may be implemented in the fuel system. In some embodiments, one or more valve may be omitted from the fuel system.

The controller 128 is shown receiving various signals from sensors 132 coupled to engine 102 and fuel system 110. The sensors 132 may measure or derive any suitable parameter that is considered to control operation of the engine 102 and/or the fuel system 110. For example, the sensors 132 may measure pressure, temperature, engine speed, etc. The controller 128 may adjust operation of actuators 130 coupled to engine 102 and fuel system 110 in order to control different modes of operation. For example, the actuators 130 may include fuel system valves, engine valves, the fuel pump, etc. The controller 128 may include a storage medium, such as read-only memory, that can be programmed with computer readable data representing instructions executable by a processor of the controller for performing the methods described below as well as other variants that are anticipated but not specifically listed.

By implementing the above described engine system in a vehicle application that employs liquid propane for combustion, a variety of potential benefits may be achieved. For example, due to the density of liquid propane relative to gaseous propane, the ability to evacuate the fuel rail after engine shut-off may provide a much greater reduction in emissions and increase in fuel economy relative to a gaseous propane application. Further, by employing an ejector that is operable based on a motive flow from a fuel pump that is already implemented in the fuel system, the fuel rail can be evacuated without the expense of an additional mechanical vacuum pump. Moreover, unlike a mechanical pump, the ejector is able to handle the phase change of liquid/gas being evacuated. Thus, even if propane undergoes a phase change during evacuation, the propane can still be pumped back to the fuel tank. Additionally, the ejector operates in a simple manner with no moving parts.

Figure 2:
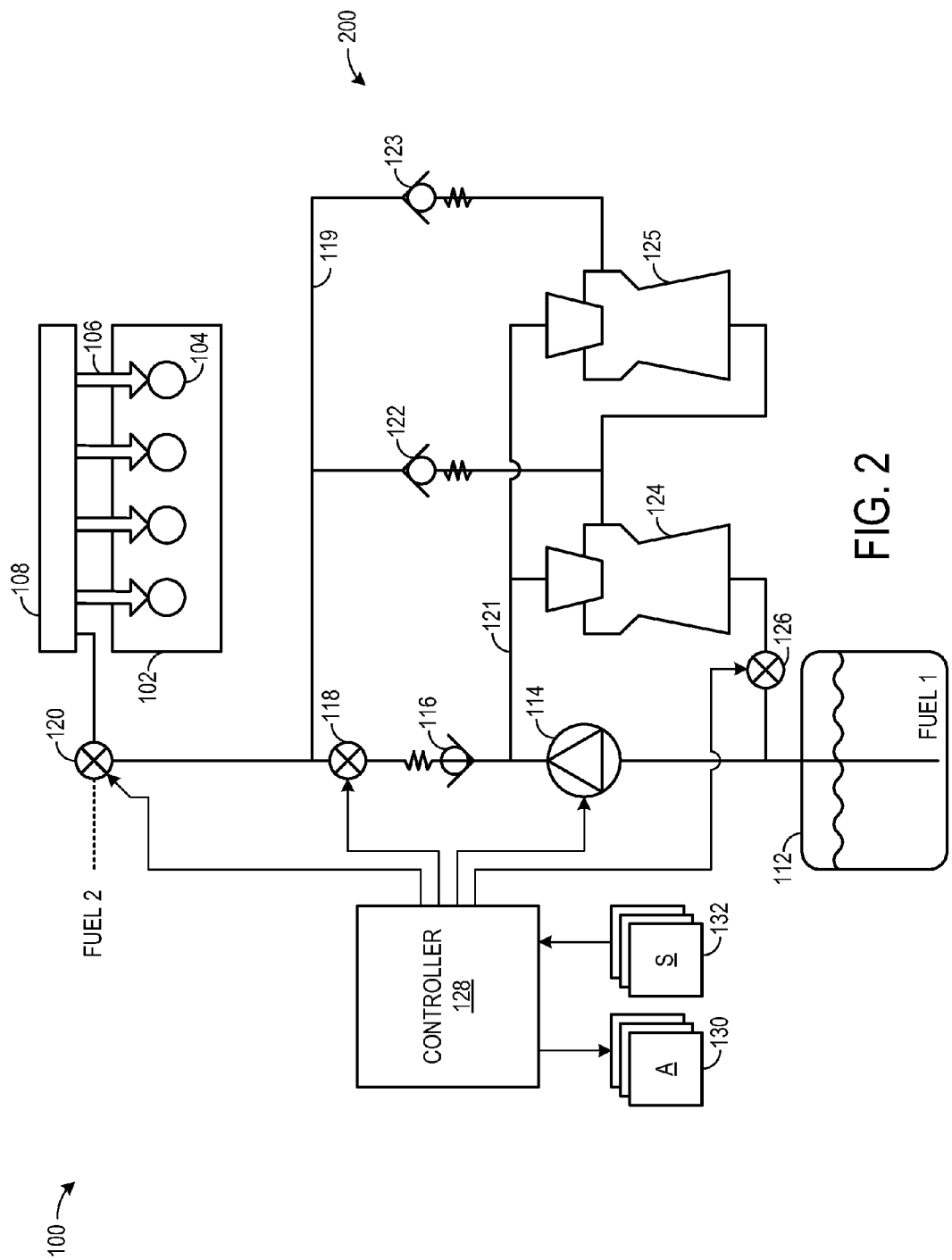
FIG. 2 shows an embodiment of a fuel system for an internal combustion engine including a plurality of fuel rail evacuation stages that each includes an ejector.

FIG. 2 schematically shows an embodiment of an engine system where a fuel system 200 includes a plurality of fuel rail evacuation stages. Each of the fuel rail evacuation stages includes an ejector that receives a motive flow from the fuel pump during an engine shut-off condition to evacuate the fuel rail. The motive flow of the ejectors is connected in parallel. The suction flow of the ejectors is connected in series so that the output of one ejector is fed to the input of another ejector which allows a lower pressure in the fuel rail to be obtained for a greater amount of fuel to be evacuated.

A first evacuation stage includes an ejector 125 which is positioned in the return line 119 upstream of a check valve 123. The ejector 125 receives a motive flow from the fuel pump 114 via motive flow line 121. Fuel is pumped into an inlet of the ejector 125 from the return line 119 to lower the pressure of the fuel rail from a first pressure level to a second pressure level. Fuel pumped from an outlet of the ejector 125 travels to a second evacuation stage and enters an inlet of the ejector 124. Fuel is pumped through the ejector 124 to lower the pressure of the fuel rail from the second pressure level to a third pressure level. Fuel pumped from an outlet of the ejector 124 is returned to the fuel tank 112 for storage.

A check valve 122 is positioned in the return line 119 in between the outlet of the ejector 125 and the inlet of the ejector 124. The check valve 122 may be set at a different actuation pressure than check valve 123 so that fuel may be pumped through the first fuel rail evacuation stage before the second stage is activated. That is, the check valve 122 and the check valve 123 work in conjunction to allow the ejector 125 to do all the pumping work in the first evacuation stage to lower the fuel rail pressure from the first pressure level to the second pressure level before the ejector 124 in the second evacuation stage becomes operable to lower the fuel rail pressure from the second pressure level to the third pressure level. The plurality of evacuation stages and, more particularly, this check valve configuration evacuates the fuel rail sooner than would be possible with only a single check valve positioned in the return line. Correspondingly, the fuel pump may be shut-off sooner after engine shut-off to reduce operating noise.

In another embodiment, ejectors may be staged so that the motive flow is connected in series. In such a configuration, any given ejector may have a performance line that trades off vacuum at zero flow rate with flow rate at zero vacuum. Series staging allows the high flow rate/low vacuum stage to work first and then the low flow rate/high vacuum stage to come into effect later.

Figure 3:
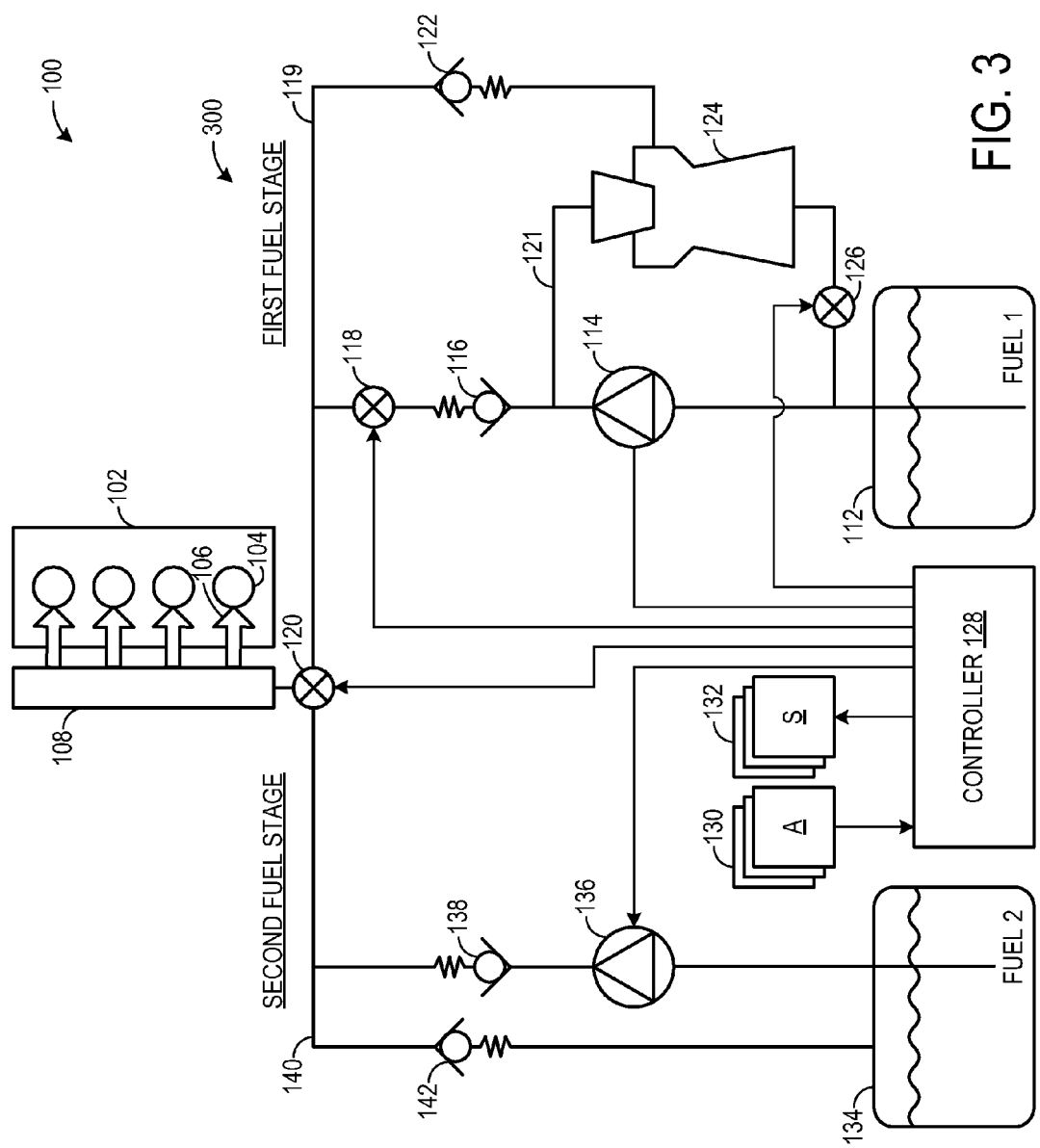
FIG. 3 shows an embodiment of a multi-fuel system for an internal combustion engine including a fuel rail evacuation stage including an ejector.

FIG. 3 schematically shows an embodiment of an engine system where a fuel system 300 selectively provides a plurality of different types of fuel to the fuel rail. Furthermore, the fuel system 300 includes a fuel rail evacuation stage to evacuate fuel that is in the fuel rail upon engine shut-off. The fuel system 300 shares a similar configuration as the fuel system 110 shown in FIG. 1 and described above. Specifically, the fuel system 300 includes a first fuel stage that includes a fuel tank 112 to store a first type of fuel, a fuel pump 114 selectively operable to pump fuel from the fuel tank 112. The fuel system 300 includes an ejector 124 positioned in a fuel return line 119. During a fuel rail pressurization mode, a first solenoid valve 118 positioned downstream of the fuel pump 114 and a second solenoid valve 126 positioned upstream of the ejector 124 can be cooperatively controlled by controller 128 to direct fuel to the fuel rail 108 for injection to cylinders 104 via fuel injectors 106 based on a state of three-way valve 120. During a fuel rail evacuation mode, the first solenoid valve 118 and the second solenoid valve 126 can be cooperatively controlled by controller 128 to direct fuel from the fuel pump 114 to the ejector 124 via motive flow line 121 to create a motive flow in the ejector to pump fuel from the fuel rail 108 to the fuel tank 112.

Furthermore, the fuel system includes a second fuel stage including a fuel tank 134 to store a second type of fuel different from the fuel type stored in fuel tank 112, a fuel pump 136 selectively operable to pump fuel from the fuel tank 134 to the fuel rail 108 based on the state of three-way valve 120. In some embodiments, the fuel pump 136 may be positioned in the fuel tank 134 in what as known as an in-tank fuel pump. A delivery check valve 138 is positioned downstream of the fuel pump 136 and upstream of the three-way valve 120. The delivery check valve 138 inhibits fuel pumped from the fuel pump 136 from returning along the same path back to the fuel pump. The second fuel stage includes a return line 140. A return check valve 142 is positioned in the return line 140 downstream of the fuel tank 134 to force excess fuel from the fuel rail 108 at a predetermined pressure to return to the fuel tank 134.

During the fuel rail pressurization mode, one or more of the first type of fuel and the second type of fuel can be provided to the fuel rail based on the state of the three-way valve 120 as controlled by the controller 128. Further during the fuel rail evacuation mode, the state of the three-way valve 120 is set by the controller 128 so that whatever type of fuel that resides in the fuel rail is directed to the first fuel stage and pumped to the fuel tank 112 via the ejector 124. It will be appreciated that evacuation of the fuel rail allows for the fuel type to be selected upon engine start because the fuel rail will be substantially empty with only some residual fuel vapor from the previous engine shutdown. By selecting the fuel type at engine start combustion can be made more stable since the characteristics of the fuel type can be known. Moreover, the ability to select a fuel type at engine start can be beneficial for stabilizing combustion in various environmental conditions.

As an example, the multi-fuel system may be implemented in a vehicle that selectively combusts liquid propane and/or gasoline. Accordingly, liquid propane may be stored in the first fuel stage and gasoline may be stored in the second fuel stage. At engine start, the controller may operate in the fuel rail pressurization mode and selects the type of fuel to be delivered to the fuel rail based on operating conditions. For example, at lower temperatures liquid propane may be selected at engine start to provide increased dispersion for more stable combustion. As another example, at higher temperatures gasoline may be selected at engine start to provide increased charge cooling of the cylinders.

Furthermore, upon engine shut-off, the controller may operate in the fuel rail evacuation mode and operates the fuel pump in the first stage to provide the motive flow to the ejector to pump whatever fuel is in the fuel rail to the fuel tank in the first fuel stage. In some cases, gasoline may be pumped into the fuel tank that stores the liquid propane. However, the amount of fuel in the fuel rail compared to the amount of fuel in the fuel tank is relatively small and has little effect on the composition of the fuel in the fuel tank.

Note in some embodiments, the fuel system 300 may be modified to include a plurality of fuel rail evacuation stages to evacuate fuel from the fuel rail upon engine shut-off in a quicker manner than would be possible with only a single fuel rail evacuation stage.

Figure 4:
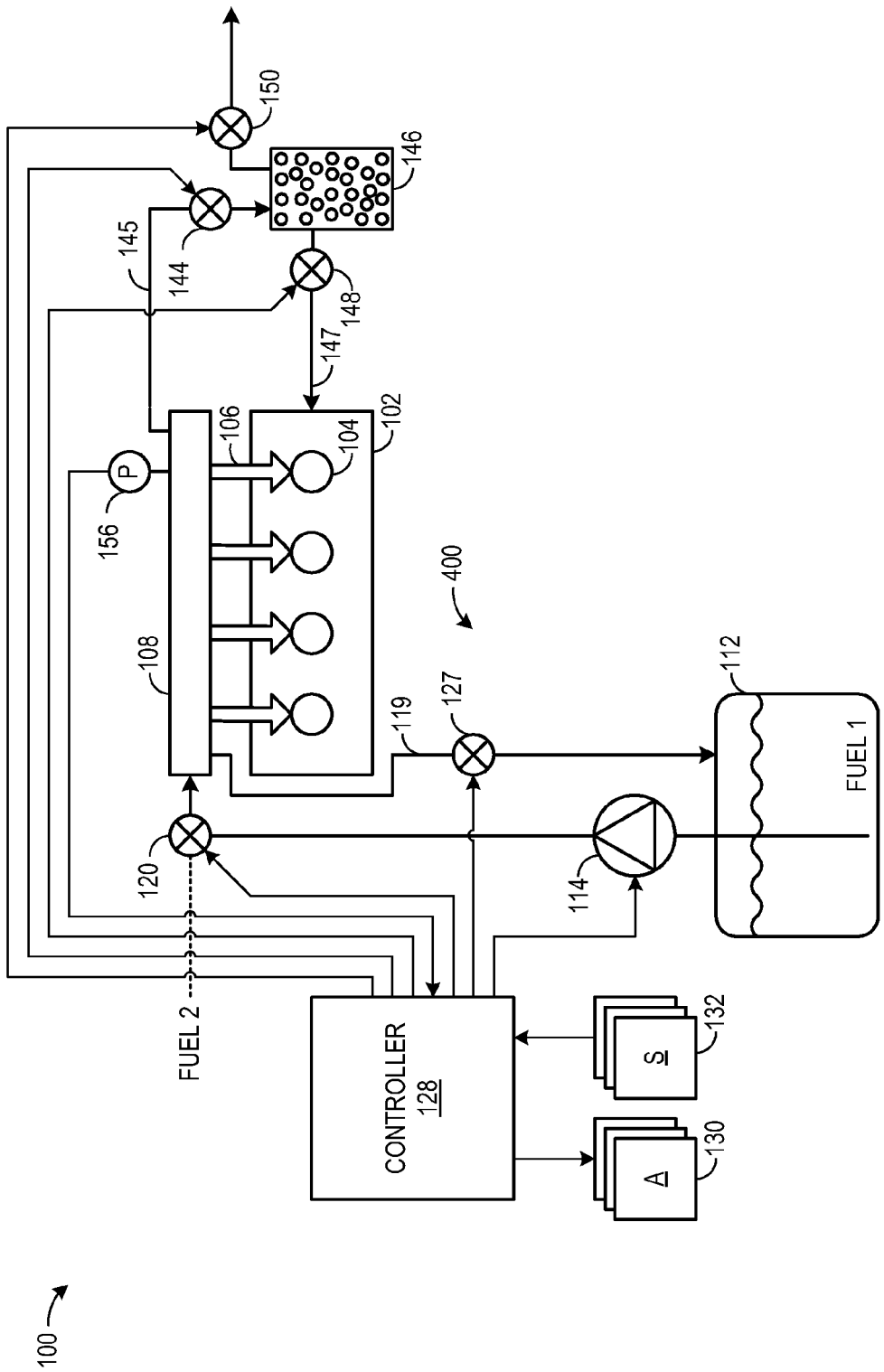
FIG. 4 shows an embodiment of a fuel system for an internal combustion engine where liquid fuel and gaseous fuel are evacuated from a fuel rail.

FIG. 4 schematically shows a fuel system 400 where fuel flow can be controlled to evacuate liquid fuel and gaseous fuel from a fuel rail during a vehicle shut-off condition. During fuel rail evacuation, the fuel system 400 is operable in a first mode where liquid fuel is evacuated from the fuel rail 108. The evacuated liquid fuel may be directed from the fuel rail 108 to the fuel tank 112. In particular, during the first mode valve 120 can be closed by controller 128 to prevent fuel from flowing back to the fuel pump 114 (or to another fuel system where applicable) and valve 127 can be opened by controller 128 to create a path in return line 119 from the fuel rail 108 to the fuel tank 112. The liquid fuel can be "pushed out" of the fuel tank based on a pressure difference between the fuel rail 108 and the fuel tank 112. For example, upon vehicle shut-off the fuel tank can to be much cooler than the fuel rail, as such, the fuel pressure in the fuel rail is much higher than the fuel pressure in the fuel tank. Since the pressure in the fuel tank is much lower, the liquid fuel can be drained from the fuel rail. In other words, the first mode of operation can be performed when the fuel rail pressure is higher than the fuel tank pressure.

Furthermore, as the liquid fuel drains from the fuel rail the remaining gaseous fuel expands to aid in pushing the liquid fuel from the fuel rail more quickly. The return line 119 and the fuel rail 108 can be designed to promote drainage of the liquid fuel. In particular, the return line 119 can be coupled to a lower or bottom portion of the fuel rail 108 to allow the more dense liquid fuel to be evacuated ahead of the gaseous fuel.

The expansion of gaseous fuel in the fuel rail causes the fuel rail pressure to drop which can inhibit the fuel from evacuating to the fuel tank. The drop in pressure can be measured by fuel rail pressure sensor 156, which can be one of a plurality of sensors 130 that measure engine and/or fuel system conditions. In response to the fuel rail pressure dropping below a threshold, the fuel system can transition out of the first mode of operation and valve 127 can be closed by controller 128. In one example, the threshold is a pressure level at which fuel in the fuel rail changes phase from liquid fuel to gaseous fuel or the critical point. In some cases, the threshold can be set to a pressure level below the critical point of the fuel.

Next, the fuel system can operate in the second mode to evacuate gaseous fuel from the fuel rail. In particular, a valve 144 located in an evaporation line 145 positioned between the fuel rail 108 and a fuel vapor canister 146 can be opened by the controller 128 so that gaseous fuel can migrate out of the fuel rail to the fuel vapor canister. In some embodiments, opening of the valve 144 can be delayed a suitable time after closing the valve 127 so as to permit the fuel rail temperature to increase so that the remaining fuel evaporates.

The fuel rail 108 can be designed to aid in migration of gaseous fuel from the fuel rail to the fuel vapor canister 146. In particular, the evaporation line can be coupled to an upper or top portion of the fuel rail so that the gaseous fuel can easily enter the evaporation line 145. As such, the evaporation line 145 can be coupled to the fuel rail at a position that is higher than a position that the return line 119 is coupled to the fuel rail. Fuel that is stored in the fuel vapor canister 146 can be supplied to an intake manifold (not shown) of engine 102 during subsequent operation via supply line 147 when valve 148 is opened by controller 128. Under some conditions such as to relieve pressure, fuel may be vented from the fuel vapor canister 146 to the atmosphere by opening valve 150. In some embodiments, the fuel rail can be evacuated by merely applying the push out conditions to drain the liquid fuel and the evaporation conditions to evacuate the gaseous fuel without use of a vacuum pump or a compressor.

Note the fuel system 400 may incorporate multi-fuel elements as described above because the fuel system has the ability to provide different fuels to the engine for combustion since the fuel rail is evacuated at vehicle shut-off.

Figure 5:
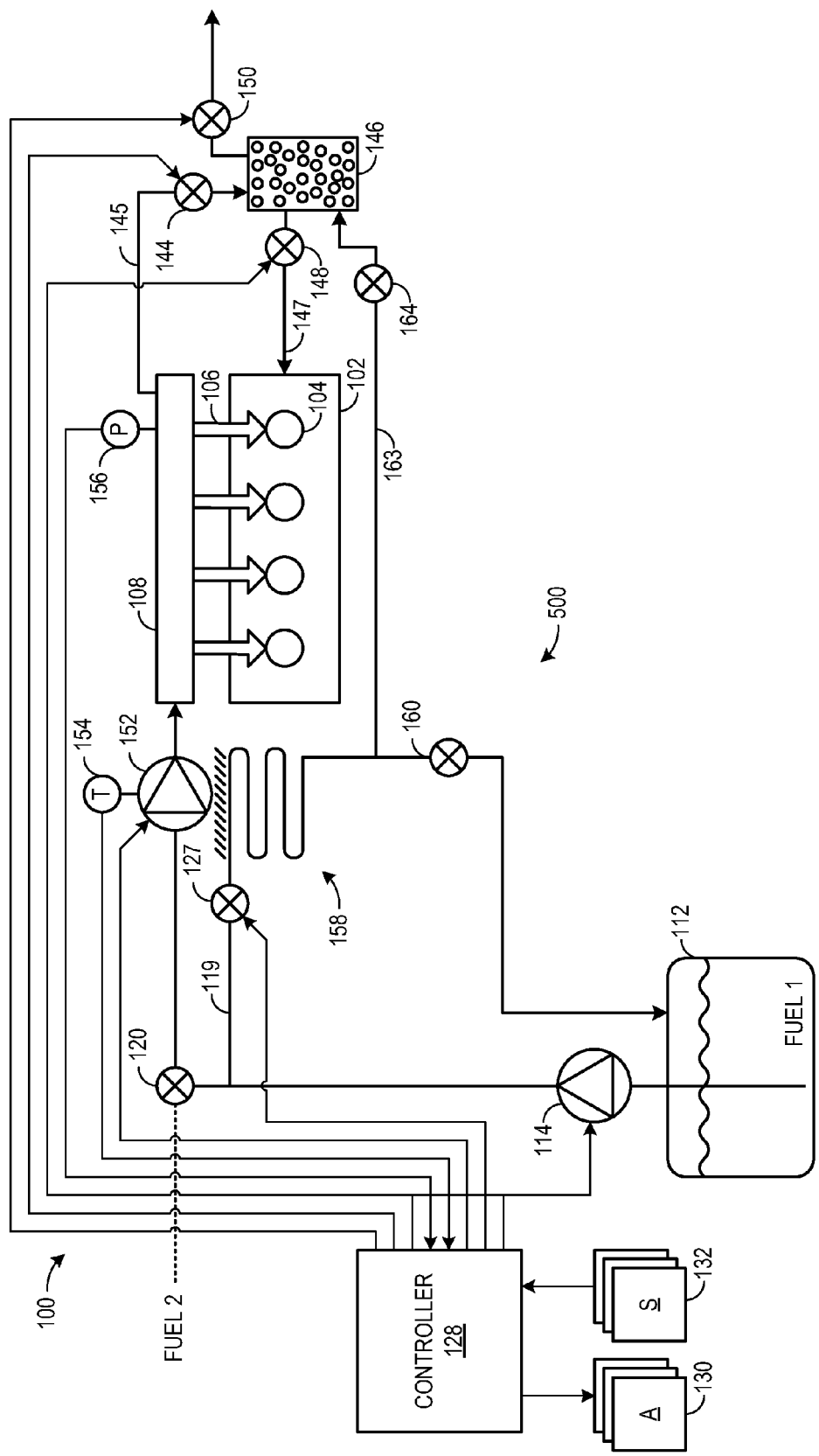
FIG. 5 shows an embodiment of a fuel system for an internal combustion engine where a fuel pump temperature is controlled based on selective fuel expansion.

FIG. 5 schematically shows a fuel system 500 where fuel flow can be controlled to regulate a temperature of a high pressure fuel pump so that fuel enters the high pressure fuel pump in a liquid state. Liquid fuel can be pumped from fuel tank 112 by an in-tank or low pressure fuel pump 114 to a high pressure fuel pump 152. The high pressure fuel pump can pump the liquid fuel to a higher pressure that is suitable for direct injection by fuel injectors 106.

A temperature sensor 154 monitors the temperature of the high pressure fuel pump 152. If the temperature of the high pressure fuel pump 152 becomes greater than a threshold, at least some liquid fuel can be directed to an expansion section 156 that is located in return line 119. The threshold may be any suitable temperature where a corresponding pressure is lower than the phase change pressure or critical point of the fuel. In particular, valve 127 opens to direct liquid fuel to the expansion section 158. In some embodiments, valve 127 may be a thermostatic valve that opens in response to reaching a predetermined temperature. In some embodiments, valve 127 may be a solenoid valve that can be opened by controller 128 in response to receiving a temperature from temperature sensor 154 that is at or above the threshold.

The expansion section 158 can be thermally connected to the high pressure fuel pump 152 so that when liquid fuel is fed to the expansion section and expands into a gaseous state a temperature drop is created that provides cooling to the high pressure fuel pump 152 and correspondingly to fuel entering the fuel pump.

After the fuel expands to a gaseous state in the expansion section 158 of return line 119, the gaseous fuel can be directed differently based on fuel system configurations and/or conditions. In some embodiments, the fuel system 500 may include an evaporation line 163 that is positioned between the fuel vapor canister 146 and the fuel return line 119 downstream of the expansion section 158. A valve 164 located in the evaporation line 163 can be opened and valve 160 can be closed by controller 128 to direct the gaseous fuel from the return line 119 to the fuel vapor canister 146. In some embodiments, the gaseous fuel may exit the expansion section 158 and valve 160 can be opened and valve 164 can be closed to return the fuel to the fuel tank 112.

Note the fuel system 500 may incorporate multi-fuel elements as described above because the fuel system has the ability to regulate the temperature of the fuel pump to accommodate different fuels having different critical points so that fuel entering the fuel pump remains in a liquid state. The configurations illustrated above enable various methods for distributing fuel in a fuel system of a motor vehicle. Accordingly, some such methods are now described, by way of example, with continued reference to above configurations. It will be understood, however, that these methods, and others fully within the scope of the present description, may be enabled via other configurations as well.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in the controller.

Figure 6:
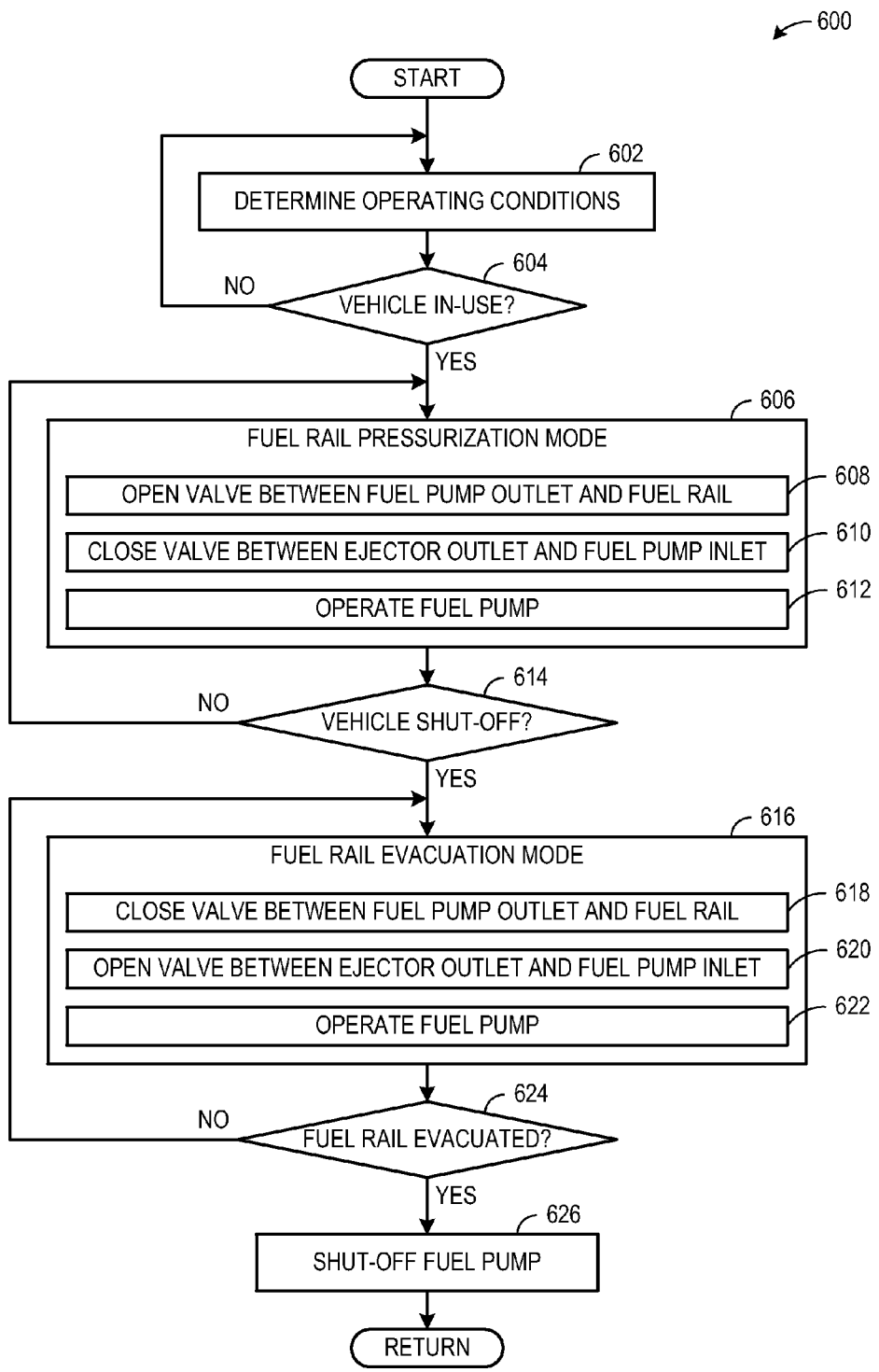
FIG. 6 shows an embodiment of a method for controlling a fuel system including one or more fuel rail evacuation stages.

FIG. 6 shows an embodiment of a method 600 for controlling a fuel system including one or more fuel rail evacuation stages. The method 600 may be performed by controller 128. At 602, the method may include determining operating conditions. Operating conditions may be determined by the controller 128 based on signals received from sensors 132. Example operating conditions include various temperatures (e.g., fuel pump, fuel rail, ambient air, engine, fuel system, etc.), various pressures (e.g., fuel rail fuel pump, fuel tank, fuel system, etc.), state of the engine, etc.

At 604, the method may include determining if the vehicle is in-use. This determination may include determining if the engine 102 is starting and/or operating. As another example, the determination may include determining if the vehicle is moving. If it is determined that vehicle is in-use the method moves to 606. Otherwise, the method returns to 604.

At 606, the method may include operating in the fuel rail pressurization mode. Operating in the fuel rail pressurization mode may include, at 608, opening the solenoid valve 118 positioned downstream of the fuel pump 114 and upstream of the fuel rail 108, at 610, closing the solenoid valve 126 positioned upstream of the ejector 124 and downstream of the fuel tank 112, and, at 412, operating the fuel pump 114 to deliver fuel from the fuel tank to the fuel rail.

At 614, the method may include determining if the vehicle is shut-off. This determination may include determining if the vehicle is turned off. In some embodiments, the engine may be shut-off but the vehicle still may be in-use, such as a hybrid vehicle operating in an electric mode. Under some conditions, the engine may be stopped and restarted repeatedly in a short period, and thus it may not be desirable to evacuate the fuel rail. As such, it may be desirable to determine whether or not to evacuate the fuel rail based on more factors than just the state of the engine. If it is determined that the vehicle is shut-off the method moves to 616. Otherwise, the method returns to 606.

At 616, it is determined that the vehicle is shut-off and the method may include operating in the fuel rail evacuation mode. Operating in the fuel evacuation mode may include at 418, closing the solenoid valve 118, at 620, opening the solenoid valve 126, and at 622, operating the fuel pump 114 to provide the motive flow to the ejector 124 to pump fuel from the fuel rail to the fuel tank 112.

At 624, the method may include determining if the fuel rail 108 has been evacuated. This determination may include determining if a predetermined evacuation time has elapsed or determining if the fuel rail has been evacuated in any other suitable manner including reading a fuel rail pressure sensor. For example, the fuel rail can be evacuated till a fuel rail pressure is lower than the fuel's vapor pressure at the present temperature, which results in all the liquid fuel being extracted from the fuel rail. Note that the fuel rail need not be evacuated to this pressure level to have a beneficial effect and evacuation may be performed to lower the fuel rail pressure till to any suitable pressure level is achieved. If it is determined that the fuel rail 108 has been evacuated the method moves to 626. Otherwise, the method returns to 624.

At 626, the method may include shutting off the fuel pump since a suitable amount of fuel has been evacuated from the fuel rail 108 or a fuel rail pressure has achieved a suitable pressure level. After the fuel pump is shut-off the method returns to other operation.

By operating in the fuel rail pressurization mode when the vehicle is in-use, fuel may be delivered to the fuel rail for injection and combustion in the engine. Furthermore, by operating in the fuel rail evacuation mode when the engine is shut-off, fuel from the fuel pump may provide the motive flow to the ejector to pump fuel from the fuel rail to the fuel tank. In this way, evaporative emissions associated with fuel evaporating and leaking out of the fuel rail via the fuel injectors may be reduced.

Figure 7:
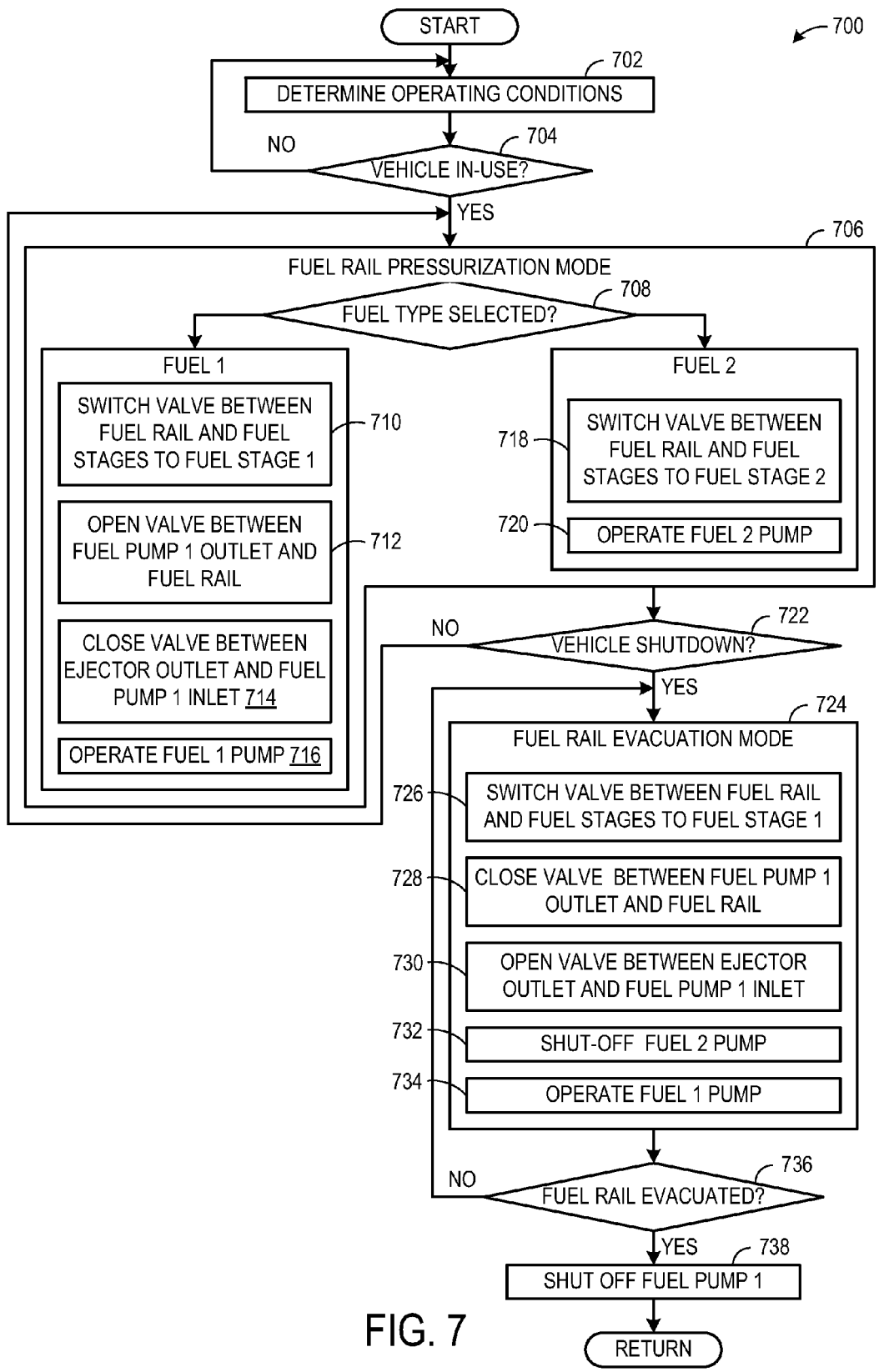
FIG. 7 shows an embodiment of a method for controlling a multi-fuel system including one or more fuel rail evacuation stages.

FIG. 7 shows an embodiment of a method 700 for controlling a multi-fuel system including one or more fuel rail evacuation stages. The method 700 may be performed by controller 128. At 702, the method may include determining operating conditions. At 704, the method may include determining if the vehicle is in-use. If it is determined that vehicle is in-use the method moves to 706. Otherwise, the method returns to 704.

At 706, the method may include operating in the fuel rail pressurization mode. At 708, the method may include determining if a first fuel from a first fuel stage or a second fuel from a second fuel is selected for delivery to the fuel rail 108. If the first fuel is selected, operating in the fuel rail pressurization mode may include, at 710, switching the three-way valve 120 to the first fuel stage, at 712, opening the solenoid valve 118 positioned downstream of the fuel pump 114 and upstream of the fuel rail 108, at 714, closing the solenoid valve 126 positioned upstream of the ejector 124 and downstream of the fuel tank 112, and, at 716, operating the fuel pump 114 to deliver the first fuel from the fuel tank to the fuel rail. If the second fuel is selected, operating in the fuel rail pressurization mode may include, at 718, switching the three-way valve 120 to the second fuel stage, and, at 720, operating the fuel pump 136 to deliver the second fuel from the fuel tank 134 to the fuel rail 108.

At 722, the method may include determining if the vehicle is shut-off. If it is determined that the vehicle is shut-off the method moves to 724. Otherwise, the method returns to 706.

At 724, it is determined that the vehicle is shut-off and the method may include operating in the fuel rail evacuation mode. Operating in the fuel evacuation mode may include at 726, switching the three-way valve 120 to the first fuel stage, at 728, closing the solenoid valve 118, at 730, opening the solenoid valve 126, at 732, shutting off the fuel pump 136, and at 734, operating the fuel pump 114 to provide the motive flow to the ejector 124 to pump fuel from the fuel rail 108 to the fuel tank 112.

At 736, the method may include determining if the fuel rail 108 has been evacuated. If it is determined that the fuel rail 108 has been evacuated the method moves to 738. Otherwise, the method returns to 724.

At 738, the method may include shutting off the fuel pump 114 since a suitable amount of fuel has been evacuated from the fuel rail 108 or a fuel rail pressure has achieved a suitable pressure level. After the fuel pump 114 is shut-off the method returns to other operation.

By operating in the fuel rail pressurization mode when the vehicle is in-use, a selected fuel may be delivered to the fuel rail for injection and combustion in the engine. Furthermore, by operating in the fuel rail evacuation mode when the engine is shut-off, fuel from the fuel pump in the first fuel stage may provide the motive flow to the ejector to pump fuel from the fuel rail to the fuel tank. In this way, evaporative emissions associated with fuel evaporating and leaking out of the fuel rail via the fuel injectors may be reduced. Moreover, since fuel the fuel rail is evacuated at engine shut-off, a fuel type may be selected for injection at engine start. In this way, combustion can be adjusted in a multi-fuel system to accommodate operating conditions.

Figure 8:
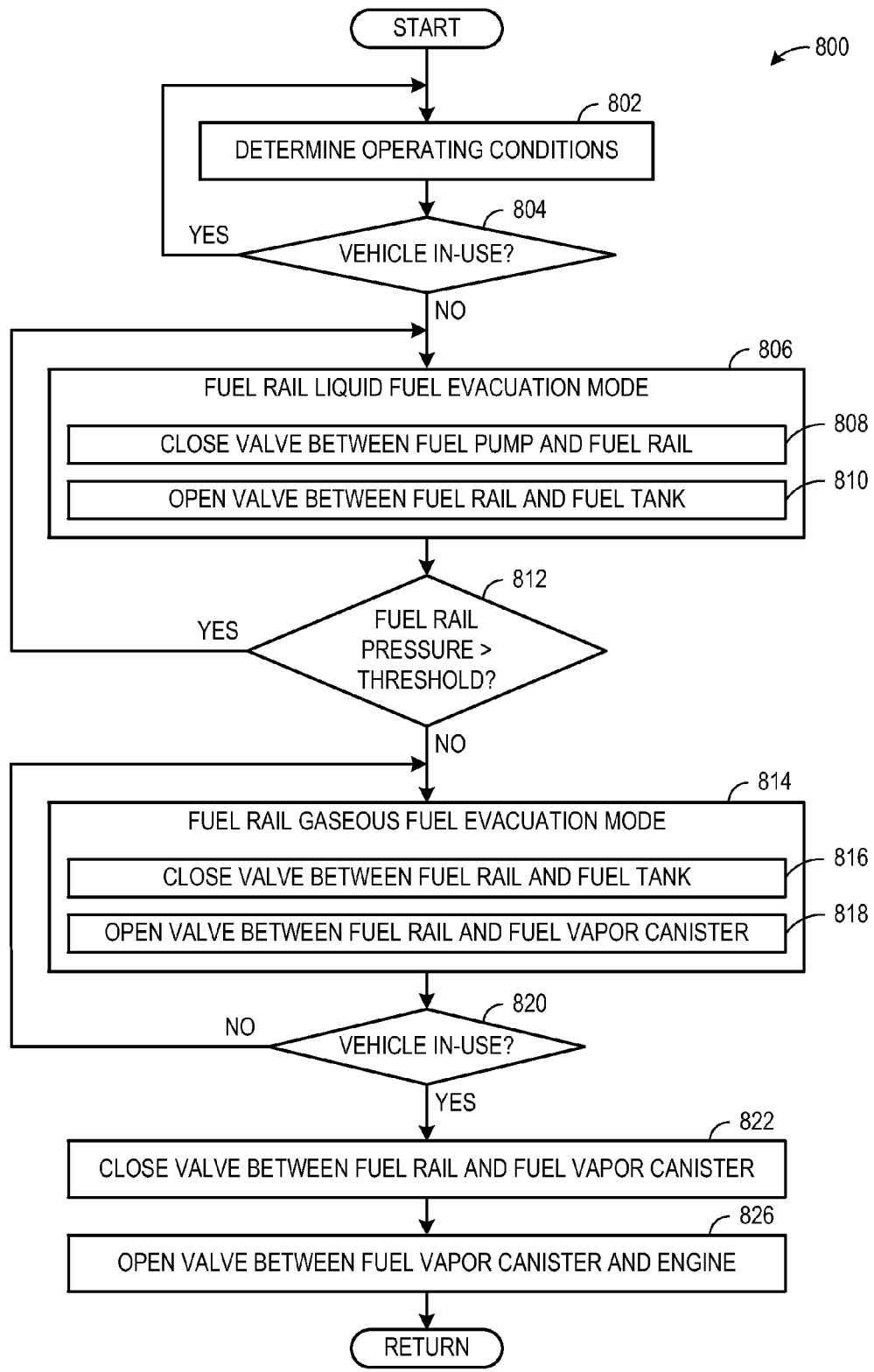
FIG. 8 shows an embodiment of a method for evacuating liquid and gaseous fuel from a fuel rail.

FIG. 8 shows an embodiment of a method 800 for controlling a fuel system to evacuate fuel from a fuel rail. The method 800 may be performed by controller 128. At 802, the method may include determining operating conditions. At 804, the method may include determining if the vehicle is in-use. If it is determined that vehicle is in-use the method moves to 806. Otherwise, the method returns to 804.

At 806, the method may include operating in a fuel rail liquid fuel evacuation mode. Operating in the fuel rail liquid fuel evacuation mode may include, at 808, closing the solenoid valve 120 positioned between the fuel pump 114 and the fuel rail 108 so that fuel does flow back to the fuel pump, and at 810, opening the solenoid valve 127 positioned in the return line 119 between the fuel rail 108 and the fuel tank 112 to deliver liquid fuel from the fuel tank to the fuel rail. Due to the difference in pressure between the fuel rail and the fuel tank at vehicle shut-off, the liquid fuel can be pushed out of the fuel rail so that it drains to the fuel tank.

At 812, the method may include determining if the fuel rail pressure is greater than a threshold. As an example, the threshold may be a pressure level at which the liquid fuel changes to a gaseous state or the critical point of the fuel. As another example, the threshold may be a pressure level lower than the critical point of the fuel. If the fuel rail pressure is greater than the threshold, the method returns to 806. Otherwise, the method moves to 814.

At 814, the method may include operating in a fuel rail gaseous fuel evacuation mode. Operation in the fuel rail gaseous fuel evacuation mode may include at 816, closing solenoid valve 127 between the fuel rail 108 and the fuel tank 112, and, at 818, opening the solenoid valve 144 between the fuel rail 108 and the fuel vapor canister 146. In some embodiments, where the fuel system includes a check valve positioned between the fuel rail and the fuel vapor canister, the solenoid valve may be opened in response to transitioning out of the fuel rail liquid fuel evacuation mode, and gaseous fuel may flow to the fuel vapor canister once the fuel rail pressure has increased enough to actuate the check valve In other embodiments, opening of solenoid valve 144 may be delay an amount of time suitable enough for fuel remaining in the fuel rail to evaporate. Once the solenoid valve 144 is open the gaseous fuel can migrate from the fuel rail 108 and be absorbed by the fuel vapor canister 146.

At 820, the method may include determining if the vehicle is in-use. As one example, the determination is made based on engine start-up. If it is determined that the vehicle is in-use, the method moves to 822. Otherwise, the method returns to 814.

At 822, the method may include closing the solenoid valve 144 to prevent fuel injected into the fuel rail from venting to the fuel vapor canister.

At 824, the method may include opening the solenoid valve 148 positioned between the fuel vapor canister and an intake of the engine to evacuate fuel from the fuel vapor canister for combustion in the engine.

By evacuating liquid fuel to the fuel tank and gaseous fuel to the fuel vapor canister, the fuel rail can be evacuated in order to reduce evaporative emissions from the fuel rail. Furthermore, by evacuating the fuel rail, the fuel system has the ability to provide one of a plurality of different types of fuels at the next start-up since the fuel rail is substantially empty. In this way, combustion can be adjusted in a multi-fuel system to accommodate operating conditions.

Figure 9:
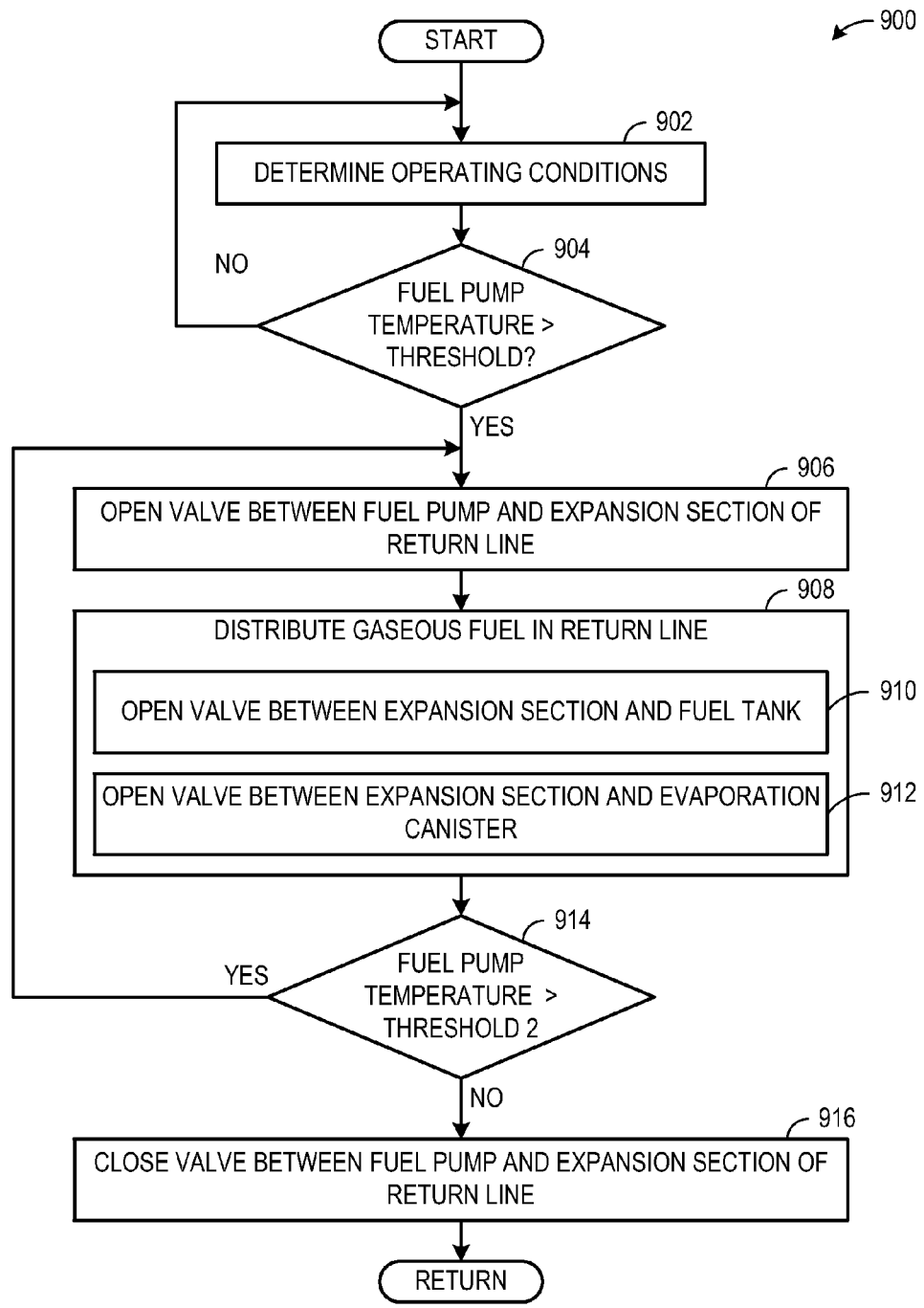
FIG. 9 shows an embodiment of a method for controlling a fuel pump temperature based on selective fuel expansion.

FIG. 9 shows an embodiment of a method 900 for controlling a fuel system to regulate a temperature of a fuel pump to permit liquid to fuel enter the fuel pump. The method 900 may be performed by controller 128. At 902, the method may include determining operating conditions. At 904, the method may include determining if a fuel pump temperature is greater than a threshold. As an example, the threshold may be a temperature corresponding to a pressure at which the fuel changes from a liquid stat to a gaseous state or the critical point of the fuel. As another example, the threshold may be a temperature corresponding to a pressure that is lower than the critical point of the fuel. If it is determined that the fuel pump temperature is greater than the threshold the method moves to 906. Otherwise, the method returns to 904.

At 906, the method may include opening the solenoid valve 127 positioned between the fuel pump 152 and the expansion section 158. Once the solenoid valve 127 is open, at least some liquid fuel pumped from fuel pump 114 is directed to the expansion section 127 where it expands to a gaseous state and creates a drop in temperature that is thermally transferred to the fuel pump 152 to cool the fuel pump.

At 908, the method may include distributing gaseous fuel in the return line 119. Under some conditions, at 910, the method may include opening the solenoid valve 160 positioned downstream of the expansion section 158 in the return line 119 and closing valve 164 to direct gaseous fuel from the expansion section to the fuel tank. Under some conditions, at 912, the method may include opening the solenoid valve 164 positioned between the fuel vapor canister 146 and the expansion section 158 and closing valve 160 to direct gaseous fuel from the expansion section to the fuel vapor canister.

At 914, the method may include determining if the fuel pump temperature is greater than a second threshold that is lower than the first threshold. If the fuel pump temperature is greater than the second threshold the method returns to 906. Otherwise, the method moves to 916.

At 916, the method may include closing the solenoid valve 127 to stop directing fuel to the expansion section 158 since the fuel pump 152 does not require cooling to permit liquid fuel to enter the fuel pump.

By directing liquid fuel to the expansion section, the liquid fuel can be used as a refrigerant to cool the fuel pump so that the liquid fuel does not reach the liquid-to-gas phase change pressure. In this way, the fuel pump temperature can be controlled so as to inhibit gaseous propane from entering the fuel pump and inhibiting fuel pump operation. Moreover, regulating the temperature of the fuel pump in this manner may permit the fuel pump to pump different types of fuel for combustion. In this way, combustion can be adjusted in a multi-fuel system to accommodate operating conditions.

It will be understood that some of the process steps described and/or illustrated herein may in some embodiments be omitted without departing from the scope of this description. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present description includes all novel and non-obvious combinations and sub-combinations of the various systems and methods disclosed herein, as well as any and all equivalents thereof. For example, methods may include delivering different fuel types to the engine via the same fuel rail under different operating conditions, where fuel flow is selectively directed through an ejector to evacuate the fuel rail of a specific type of fuel so that the rail may be filled and pressurized with a different fuel type. The evacuation may occur during engine shutdown, engine rest, engine off, (any of which may be during vehicle running (hybrid-vehicle) conditions), and/or vehicle off/shutdown conditions.

The invention claimed is:

1. A method for controlling vehicle fuel flow, comprising:
   directing a liquid propane fuel from a fuel tank to a fuel pump, and then to a fuel rail with direct injectors; and
   responsive to a fuel pump temperature being greater than a threshold, directing some liquid propane fuel to an expansion section, thermally connected to the fuel pump, the liquid fuel evaporating to gaseous fuel to thereby cool the fuel pump.

2. The method of claim 1, further comprising:
   directing the gaseous fuel to a fuel vapor canister.

3. The method of claim 1, further comprising:
   directing the gaseous fuel to the fuel tank.

4. The method of claim 1, further comprising:
   evacuating the fuel rail at shutdown.

5. The method of claim 1, wherein the threshold is lower than a temperature corresponding to a pressure where the liquid fuel undergoes a phase change to gas.

6. The method of claim 1, wherein the expansion section is located in a return line positioned between the fuel pump and the fuel tank, and directing includes opening a valve located in the return line between the fuel pump and the expansion section.

7. The method of claim 1, further comprising operating the engine with gasoline fuel.

8. The method of claim 1, further comprising:
   evacuating the fuel rail of the liquid propane fuel.

9. A system for controlling fuel flow in a vehicle, comprising:
   a fuel tank;
   a first fuel pump operable to pump liquid propane fuel from the fuel tank to a fuel rail having direct fuel injectors;
   a fuel return line positioned upstream of the fuel pump and downstream of the fuel tank;
   an expansion section located in the return line and thermally connected to the fuel pump;
   a first valve positioned between the expansion section and the fuel pump, the first valve opening in response to a temperature of the fuel pump being greater than a threshold, to direct at least some of the liquid propane fuel to the expansion section where the liquid propane fuel evaporates to a gaseous fuel to thereby cool the fuel pump.

10. The system of claim 9, wherein the first valve is a solenoid valve, the system further comprises:
    a controller for opening the solenoid valve in response to the temperature of the fuel pump being greater than the threshold.

11. The system of claim 10, wherein the first fuel pump comprises a high pressure fuel pump, the system further comprises:
    a fuel rail positioned downstream of the first fuel pump;
    one or more direct injection fuel injectors to inject fuel from the fuel rail; and
    a second fuel pump located in the fuel tank.

12. The system of claim 10, further comprising:
    a fuel vapor canister;
    an evaporation line positioned between the fuel vapor canister and the return line at a location between the expansion section and the fuel tank;
    a second valve located between the expansion section and the fuel vapor canister;
    a third valve located between the fuel tank and the evaporation line; and
    the controller opening the second valve and closing the third valve to direct the gaseous fuel to the fuel vapor canister.

13. The system of claim 9, wherein the first valve is a thermostatic valve that opens in response to the temperature of the fuel pump being greater than the threshold.

14. The system of claim 9, wherein the threshold is lower than a temperature corresponding to a pressure where the liquid propane fuel undergoes a phase change to gas.

15. A system for controlling fuel flow in a vehicle, comprising:
    a first fuel tank;
    a first fuel pump operable to pump liquid propane fuel from the first fuel tank to a fuel rail having direct fuel injectors;
    a first fuel return line positioned upstream of the first fuel pump and downstream of the first fuel tank;
    an expansion section located in the return line and thermally connected to the first fuel pump;
    a first valve positioned between the expansion section and the first fuel pump, the first valve opening in response to a temperature of the first fuel pump being greater than a threshold, to direct at least some of the liquid propane fuel to the expansion section where the liquid propane fuel evaporates to a gaseous fuel to thereby cool the first fuel pump; and
    a second fuel tank for storing a second fuel type.

16. The system of claim 15 further comprising
    a second fuel pump to pump fuel from the second fuel tank.

* * * * *